(12) United States Patent
Nagatani et al.

(10) Patent No.: US 8,218,205 B2
(45) Date of Patent: Jul. 10, 2012

(54) MULTI-FUNCTIONAL DEVICE HAVING SCANNER MODULE AND IMAGE SCANNING APPARATUS EMPLOYING THE SCANNER MODULE

(75) Inventors: Kaname Nagatani, Seongnam-si (KR); Dong-hun Lee, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 903 days.

(21) Appl. No.: 12/118,856

(22) Filed: May 12, 2008

(65) Prior Publication Data

US 2009/0034030 A1    Feb. 5, 2009

(30) Foreign Application Priority Data

Jul. 31, 2007   (KR) .................. 10-2007-0076640

(51) Int. Cl.
*H04N 1/04*    (2006.01)
(52) U.S. Cl. ......... 358/475; 358/484; 358/483; 358/482
(58) Field of Classification Search .................. 358/484, 358/475, 509, 483, 482, 512–514; 399/220, 399/221; 355/67; 250/234–236, 208.1
See application file for complete search history.

(56) References Cited

U.S. PATENT DOCUMENTS

| | | |
|---|---|---|
| 6,172,784 B1 | 1/2001 | Konda |
| 6,326,602 B1 | 12/2001 | Tabata |
| 6,357,903 B1 | 3/2002 | Furusawa et al. |
| 7,110,149 B2 * | 9/2006 | Cho .............................. 358/474 |
| 7,316,353 B2 * | 1/2008 | Ikeda et al. .................... 235/454 |
| 7,502,148 B2 * | 3/2009 | Wang ............................. 358/509 |
| 7,548,352 B2 * | 6/2009 | Sakurai et al. ................ 358/475 |
| 7,609,412 B2 * | 10/2009 | Maruyama .................... 358/1.9 |
| 2003/0012036 A1 | 1/2003 | Uemura et al. |
| 2003/0137751 A1 | 7/2003 | Hayashide |

(Continued)

FOREIGN PATENT DOCUMENTS

CN    1761282    4/2006
EP    0 874 517 A2    10/1998

OTHER PUBLICATIONS

European Search Report issued Sep. 9, 2009 in EP Application No. 08153746.6.

(Continued)

*Primary Examiner* — Cheukfan Lee
(74) *Attorney, Agent, or Firm* — Stanzione & Kim, LLP

(57) ABSTRACT

A multi-functional device comprising an image forming apparatus to form a printing image and a scanner module to scan an image in a first scanning direction. The scanner module includes an illuminator to illuminate a light to a document mount, a sensor unit to read an image information of an object placed on the document mount, and an imaging lens which is disposed between the document mount and the sensor unit and focuses the light reflected from the object onto the sensor unit. The illuminator includes a light source to emit light, a light guiding unit which is lengthened in a second scanning direction, faces the document mount and changes a traveling path of the light emitted from the light source to illuminate the document mount, and a guide holder which comprises an installation part where the light guiding unit is installed, and a mounting part where the light source holder is mounted to provide the light source at least one side of the light guiding unit.

38 Claims, 10 Drawing Sheets

U.S. PATENT DOCUMENTS

2003/0189827 A1  10/2003  Cheng
2005/0150956 A1  7/2005  Ikeda et al.

OTHER PUBLICATIONS

European Office Action issued Mar. 10, 2011 in EP Application No. 08153746.6.

Chinese Office Action issued Aug. 30, 2011 in CN Application No. 200810135335.9.

Extended European Search Report issued in European Patent Application No. 11180781.4 on Oct. 20, 2011.

* cited by examiner

MULTI-FUNCTIONAL DEVICE HAVING SCANNER MODULE AND IMAGE SCANNING APPARATUS EMPLOYING THE SCANNER MODULE

CROSS-REFERENCE TO RELATED APPLICATIONS

This application claims priority under 35 U.S.C. §119(a) from Korean Patent Application No. 10-2007-0076640, filed on Jul. 31, 2007 in the Korean Intellectual Property Office, the disclosure of which is incorporated herein by reference in its entirety.

BACKGROUND OF THE INVENTION

1. Field of the Invention

The present general inventive concept relates to a multi-functional device having a scanner module and an image scanning apparatus employing the scanner module, and more particularly, to a multi-functional device having a scanner module and an image scanning apparatus employing the scanner module, in which an illuminating structure is precisely assembled without being damaged.

2. Description of the Related Art

A scanner module, which is generally employed in a multi-functional device having an image forming apparatus, scans image information at a predetermined position of a document with light from an illuminator and forms an image on an image sensor on the basis of the light reflected from the document through an imaging lens, thereby reading the image information from a predetermined position of the document.

As an inexpensive and high-intensity white light emitting diode (LED) has recently been developed, a scanner module employing the white LED as a light source has also appeared.

The illuminator for the scanner module has to secure sufficient brightness in a region where an image is formed and equally distribute illumination to get uniform output throughout pixels of the formed image. Accordingly, a light guiding unit is needed for guiding the light from the LED to an illuminating position.

A conventional LED and a light guiding unit employing the same have been disclosed in U.S. Pat. No. 6,357,903 B1 (Furusawa et al., Published on Mar. 19, 2002)

Referring to this conventional LED and the light guiding unit, the light source is placed at one end portion of a transparent light guiding unit, and the light guiding unit is installed into a case by sliding insert from one side opening of the case.

However, if the illuminator having this conventional structure is applied to the scanner module, the light guiding unit may be scratched when the light guiding unit slides into the case, thereby causing deterioration in guiding the light. Further, when the light guiding unit is installed in the case, there is no structure of precisely guiding the light guiding unit to an installation position, thereby causing deterioration in precise assembly.

Also, the illuminator employed in the scanner module has to be readily assembled so as to mass-produce the scanner module. Meanwhile, because the light guiding unit is made of a transparent material and has a long and thin structure, it can easily become bent. Therefore, a guide holder for supporting the light guiding unit is required to have a structure enough to keep a straight shape of the light guiding unit.

SUMMARY OF THE INVENTION

The present general inventive concept provides a multi-functional device having an image forming apparatus and a scanner module and an image scanning apparatus employing the same, in which an LED and a light guiding unit are easily and precisely assembled into an illuminator without being damaged, and the light guiding unit is kept straightened.

Additional aspects of the present general inventive concept will be set forth in part in the description which follows and, in part, will be obvious from the description, or may be learned by practice of the present general inventive concept.

The foregoing and/or other aspects of the present general inventive concept can be achieved by providing a multi-functional device comprising: an image forming apparatus; and a scanner module scanning an image in a first scanning direction, comprising an illuminator to illuminate a light to a document mount, a sensor unit to read an image information of an object placed on the document mount, and an imaging lens which is disposed between the document mount and the sensor unit and focuses the light reflected from the object onto the sensor unit, wherein, the illuminator comprising a light source to emit light, a light guiding unit which is lengthened in a second scanning direction, faces the document mount and changes a traveling path of the light emitted from the light source to illuminate the document mount, and a guide holder which comprises an installation part where the light guiding unit is installed, and a mounting part where the light source holder is mounted to provide the light source at least one side of the light guiding unit.

The light source holder may join with the mounting part by a snap-fit manner.

The illuminator may further comprise: a hook member provided in one of the light source holder and the mounting part; and a projection may provide in the other one at a position opposite to the hook member.

The light source holder may join with the mounting part in a lengthwise direction of the light guiding unit.

The light source holder may join with the mounting part in a direction perpendicular to a lengthwise direction of the light guiding unit.

The light source may comprise: a substrate installed at the light source holder; and a light emitting diode provided on the substrate.

The light source holder may comprise a holding part to hold the light guiding unit installed in the installation part.

The light source holder may comprise a holding rib provided in the holding part and contacting the light guiding unit when the light guiding unit is installed in the installation part.

The holding rib may have a tapered shape to reduce damage on the light guiding unit when the light source holder joins with the guide holder.

The holding rib may further comprise an elastically transformable neck part between the holding part and the holding rib.

The illuminator may further comprise a position determiner to determine an installation position of the light source holder with regard to the guide holder.

The installation part may be recessed inwardly and lengthened in the second scanning direction, and the light guiding unit is fitted into the installation part from over the installation part.

The guide holder may be formed with flexible material so that the installation part can become wider as pushed by the light guiding unit while installing the light guiding unit therein.

The illuminator may comprise a spacer provided inside the installation part so that the spacer can contact and support the light guiding unit when the light guiding unit is fitted into the installation part.

The spacer and the installation part may be formed as a single body.

The spacer may comprise a plurality of spacers which are distant from each other along the lengthwise direction of the light guiding unit.

The scanner module may further comprise a plurality of reflecting mirrors between the document mount and the imaging lens to reflect light from the object and change a traveling path of the light.

The scanner module may further comprise a window provided between the illuminator and the plurality of reflecting mirrors to restrict light traveling toward the sensor unit.

The foregoing and/or other aspects of the present general inventive concept can also be achieved by providing an image scanning apparatus comprising a scanner module, and an image processor that processes an image obtained by the scanner module.

The image processor may comprise at least one of: a file creating part to create an image file from the obtained image; and an image forming part to form a printing image corresponding to the obtained image on a printing medium.

The foregoing and/or other aspects of the present general inventive concept can also be achieved by providing a scanning apparatus, including an illuminator having a light source holder having a light source to emit light, a light guiding unit lengthened in a second scanning direction to change a traveling path of the light emitted from the light source, and a guide holder having an installation part where the light guiding unit is installed, and a mounting part where the light source holder is mounted so as for the light source to provide the light toward at least one side of the light guiding unit.

The scanning apparatus may further include a document mount to accommodate a document, and the light guiding unit may include first and second light guiding members spaced-apart from each other by a gap in a direction perpendicular to a lengthwise direction of the light guiding unit to receive first light and second light from the light source in a direction and to emit the received first light in a first direction and the received second light in a second direction toward a portion of the document, such that the first light and the second light are reflected from the portion of the document and passes through the gap of the first and second light guiding members.

The light guiding unit may further include a position determiner disposed between the first and second light guiding members to separate the first and second light guiding members by the gap and coupled to the light source holder to determine a position of the light source with respect to the first and second light guiding members.

The light source holder may include a first surface formed with a hole to correspond to the light source and the at least one side of the light guiding unit, and a second surface extended from the first surface in the lengthwise direction having a shape to correspond to and hold an end portion of the light guiding unit.

The light source holder may further include a holding rib formed on the second surface to elastically move to hold the light guiding unit.

The light source holder may hold an end of the light guiding unit when the light source holder is mounted to the mounting part of the guide holder.

The light source holder may hold an end of the light guiding unit when the installation part holds a middle portion of the light guiding unit.

The installation part may have a shape varying according to the installation of the light guiding unit to the installation part to elastically support the light guiding unit.

The light source holder may include a holding rib to elastically hold a surface of the light guiding unit, and the guide holder may include a spacer formed on a surface of the installation part to contact another surface of the light guiding unit such that a contact area between the installation part and the light guiding unit is reduced.

The foregoing and/or other aspects of the present general inventive concept can also be achieved by providing a scanning apparatus, including an illuminator to illuminate light to a document mount, and having a guide holder having an installation part formed in a lengthwise direction, and a mounting part formed on an end of the guide holder, a light source holder having a light source, and disposed toward the end of the guide holder to be coupled to the mounting part of the guide holder such that the light source emits light in the lengthwise direction, and a light guiding unit disposed in the guide holder in the lengthwise direction, and having an incident surface to receive the light from the light source in the lengthwise direction, and having an exit surface formed to have a length in the lengthwise direction to transmit the light in a direction having an angle with the lengthwise direction.

The light guiding unit may further include a guide surface formed between the incident surface and the exit surface and having a first side and a second side having an angle with the first side, and the installation part may include first and second installation parts to correspond to the first and second sides of the guide surface and to elastically move with respect to each other to elastically hold or support the light guiding unit.

The installation part may include a spacer to support the light guiding unit in the lengthwise direction and to provide a gap between a surface of the light guiding unit and a surface of the installation part.

The guide holder may include a holding part to support an end portion of the light guiding unit, and installation part may include a spacer to support the light guiding unit and to provide a gap between a surface of the light guiding unit and a surface of the installation part.

BRIEF DESCRIPTION OF THE DRAWINGS

These and/or other aspects and utilities of the present general inventive concept will become apparent and more readily appreciated from the following description of the exemplary embodiments, taken in conjunction with the accompanying drawings, in which.

DETAILED DESCRIPTION OF THE PREFERRED EMBODIMENTS

Figure 1:
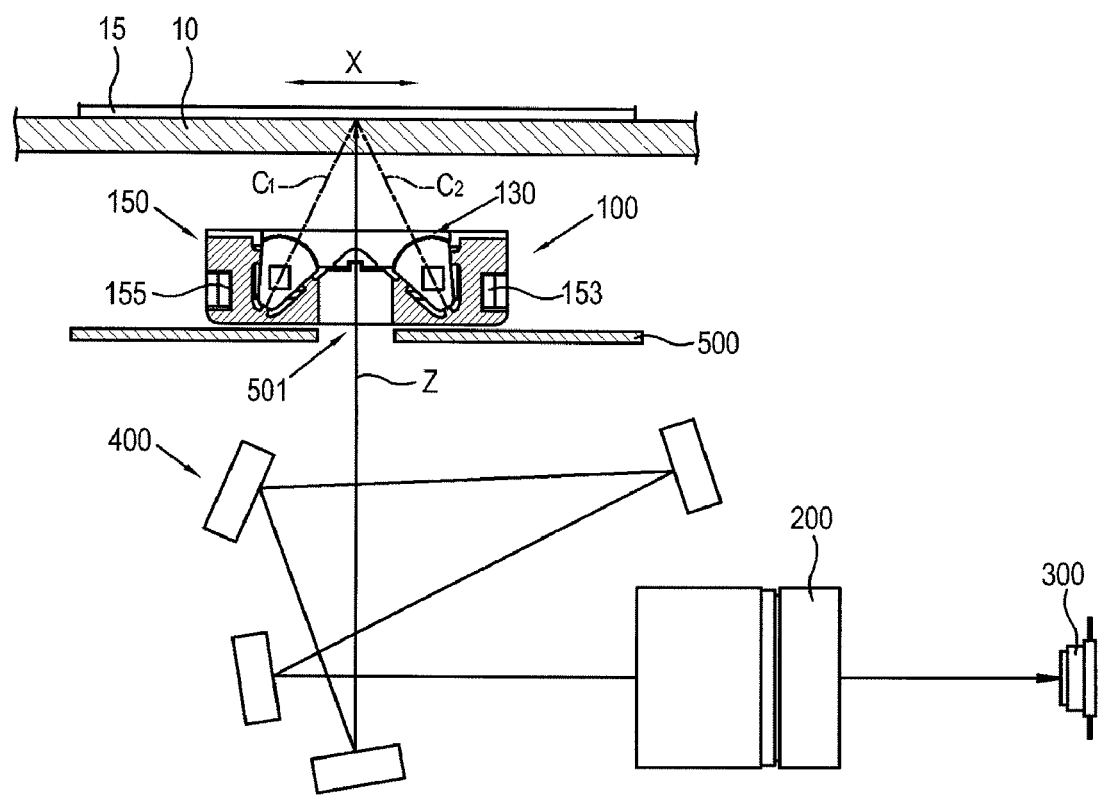
FIG. 1 is a view illustrating arrangement of optical elements in a scanner module usable with a multi-functional device according to an exemplary embodiment of the present general inventive concept.

Reference will now be made in detail to the embodiments of the present general inventive concept, examples of which are illustrated in the accompanying drawings, wherein like reference numerals refer to like elements throughout. The embodiments are described below so as to explain the present general inventive concept by referring to the figures.

Referring to FIG. 1, a scanner module employed in a multi-functional device according to an exemplary embodiment of the present general inventive concept includes an illuminator 100 to illuminate light to an object 15 placed on a document mount 10, such as a glass plate, an imaging lens 200, and a sensor unit 300 to read image information of the object 15 from light reflected from the object 15 such as a document or the like, thereby scanning an image in a first scanning direction X. The scanner module may include a driving unit to make a relative movement between the object 15 and the illuminator 100 in the first scanning direction X so as for the object to be scanned in the first scanning direction X.

Figure 2:
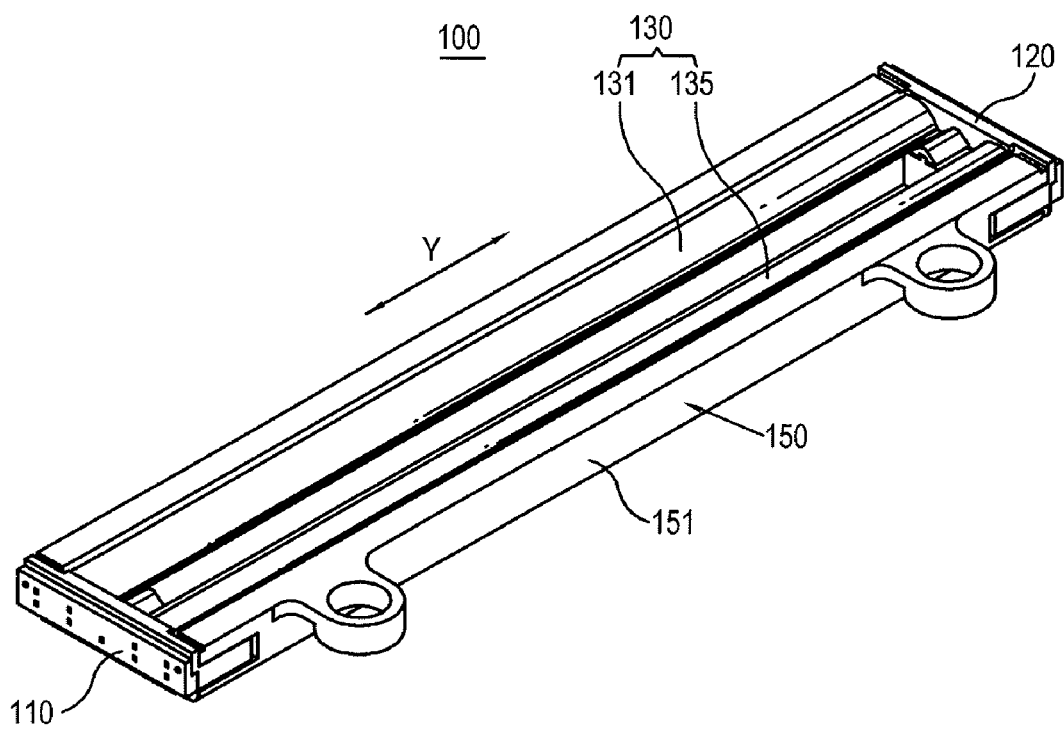
FIG. 2 is a perspective view illustrating an example of an illuminator in the scanner module according to an exemplary embodiment of the present general inventive concept.

Referring to FIGS. 1 and 2, the illuminator 100 includes a light source 110 to emit light, a light source holder 120 to hold the light source 110, a light guiding unit 130 lengthened (formed in a lengthwise direction thereof) in a second scanning direction Y having an angle with the first scanning direction X to face the document mount 10, and a guide holder 150 having a guide holder main body 151, a mounting part 153, and an installation part 155 to hold the light guiding unit 130. Detailed configurations of the illuminator 100 will be described later.

The imaging lens 200 is disposed between the document mount 10 and the sensor unit 300, and focuses light reflected from the object 15 onto the sensor unit 300.

The sensor unit 300 reads information about the object 15 from light focused by the imaging lens 200. The sensor unit 300 has a single-row structure or a plural-row structure to scan a red/green/blue-colored or red/green/blue/black-colored image. That is, the sensor unit 300 may include image sensors spaced apart from each other at a predetermined distance and arranged in plural lows corresponding to colors.

Further, a mirror unit, such as a plurality of reflecting mirrors 400, may be provided between the object 15 and the imaging lens 200. The plurality of reflecting mirrors 400 reflects light from the object 15 and changes a traveling path of the light, thereby securing a predetermined optical path in a limited space in the image scanning apparatus or in a limited space between the document mount 10 and sensor 300. If the plurality of reflecting mirrors 400 is added, the scanner module can have a compact size while securing an optical distance to focus an image between the object 15 and the sensor unit 200. FIG. 1 illustrates four reflecting mirrors 400 by way of example, but not limited thereto. Alternatively, the number of reflecting mirrors 400 may vary as necessary.

Additionally, the scanner module according to the present embodiment may include a plate 500 having a window 501 to restrict a light traveling toward the sensor unit 300. The plate 500 is placed between the illuminator 100 and the plurality of reflecting mirrors 400 and screens out unavailable light reflected from the object 15.

Figure 6:
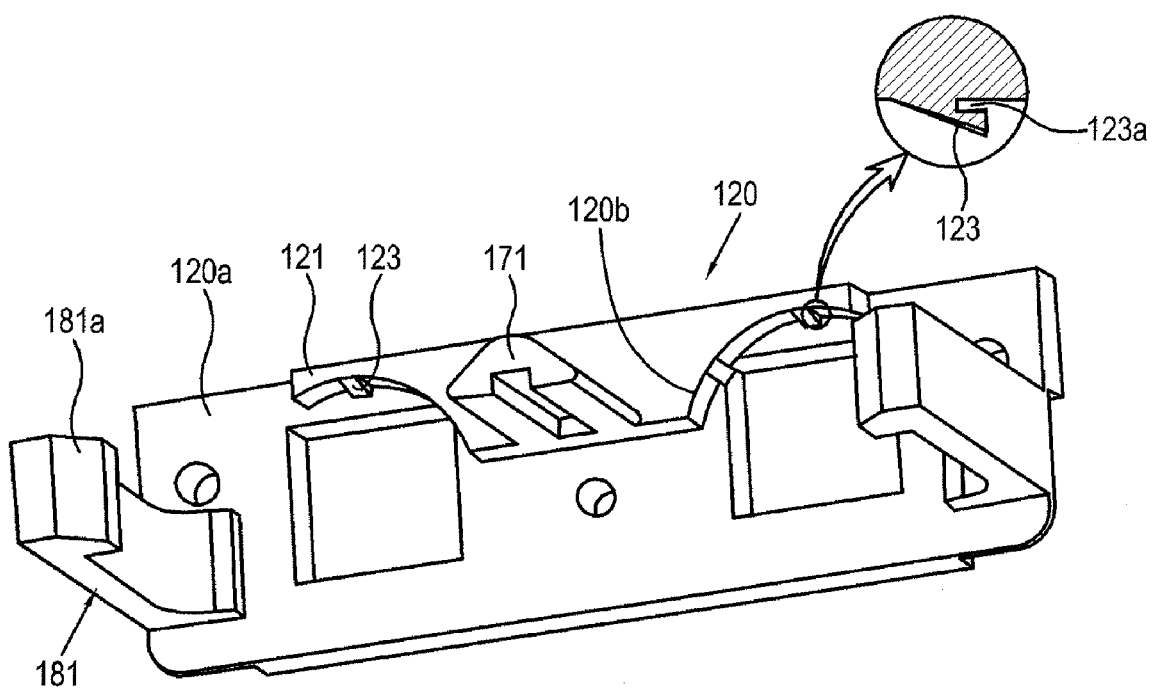
FIG. 6 is a perspective view of a light source holder in the scanner module according to an exemplary embodiment of the present general inventive concept.
Figure 7:
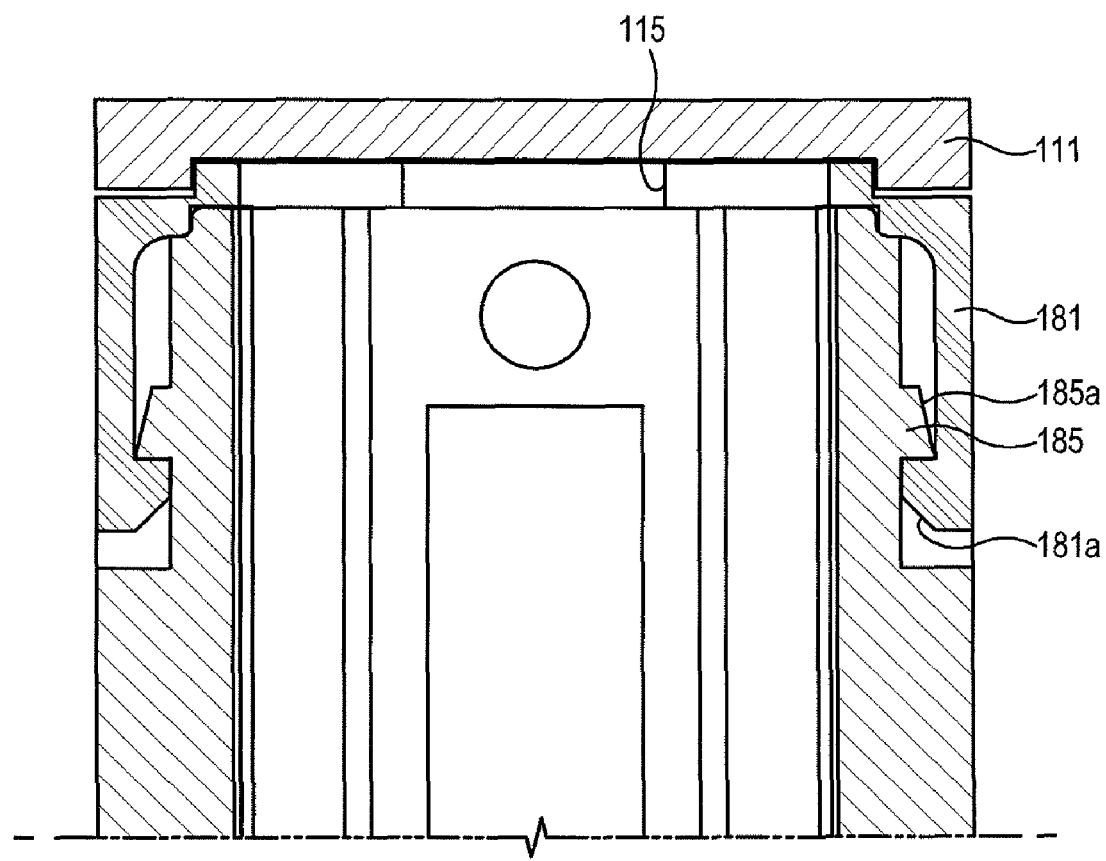
FIG. 7 is a partially sectional view illustrating an assembled state of a guide holder and the light source holder of FIG. 2.

FIGS. 2 through 5 are a perspective view, an exploded perspective view, a partially sectional perspective view and a sectional view of the illuminator 100 employed in the scanner module of FIG. 1 according to an exemplary embodiment of the present general inventive concept, respectively. Further, FIG. 6 is a perspective view of the light source holder 120 in the scanner module of FIGS. 2 through 5 according to an exemplary embodiment of the present general inventive concept, and FIG. 7 is a partially sectional view illustrating an assembled state of the guide holder 150 and the light source holder 120 of FIG. 2.

Figure 3:
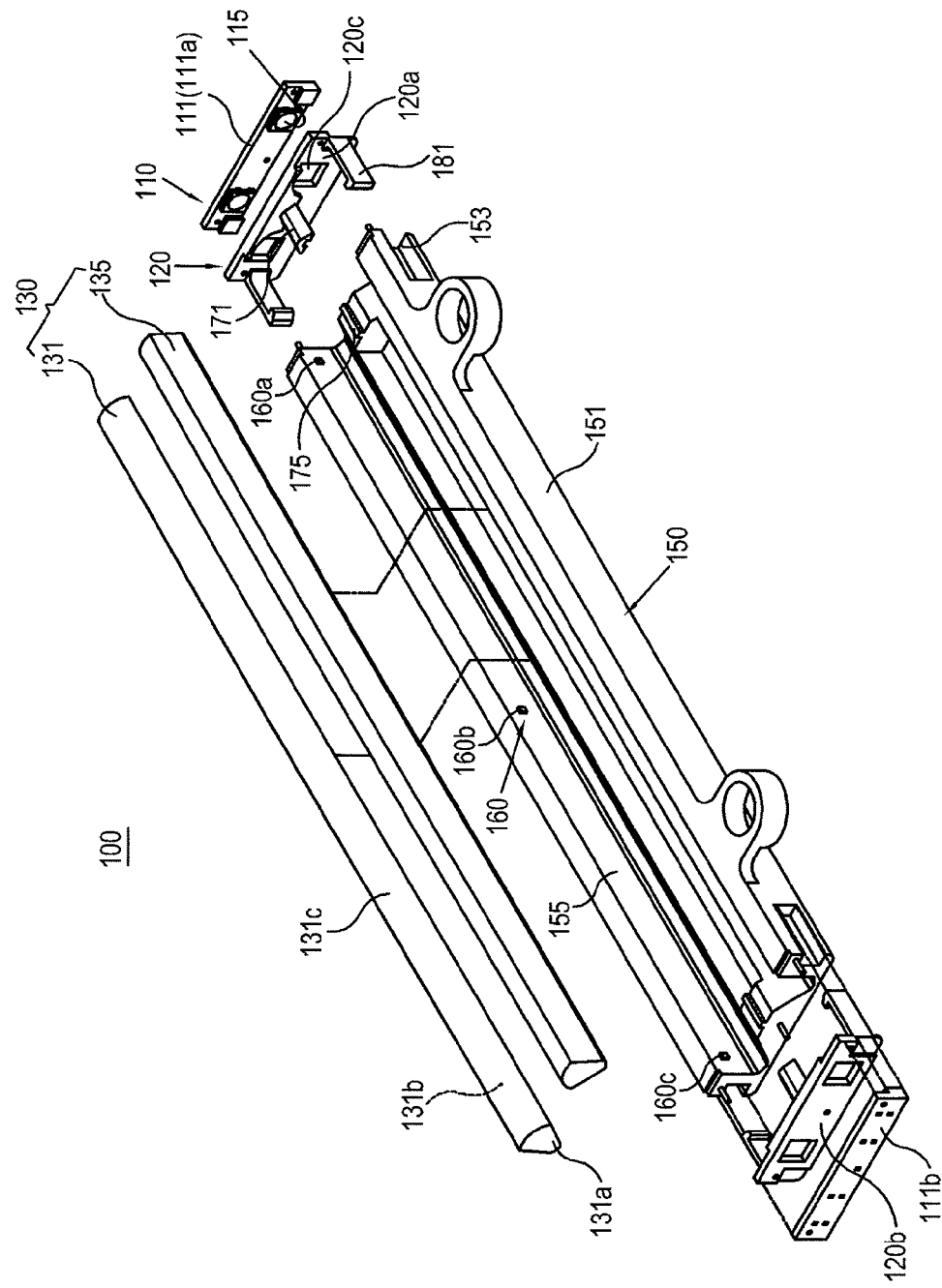
FIG. 3 is an exploded perspective view of the illuminator in FIG. 2.
Figure 4:
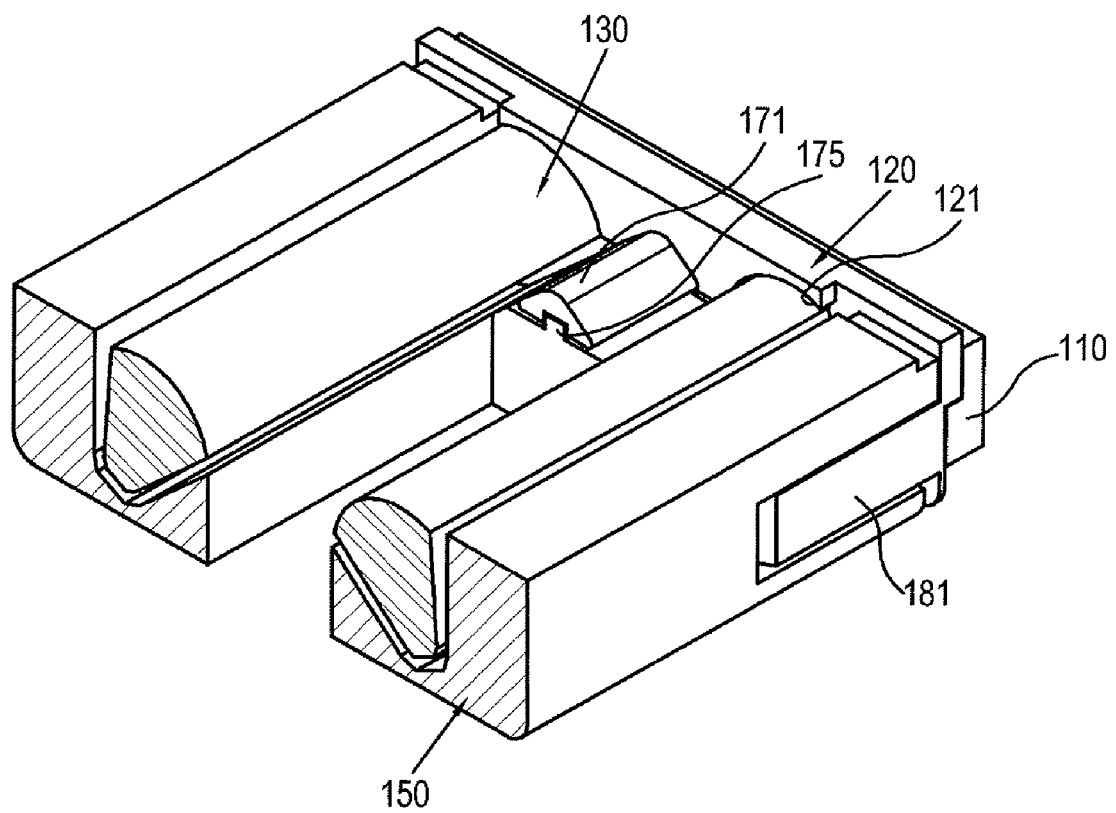
FIG. 4 is a partially sectioned perspective view of the illuminator in FIG. 2.
Figure 5:
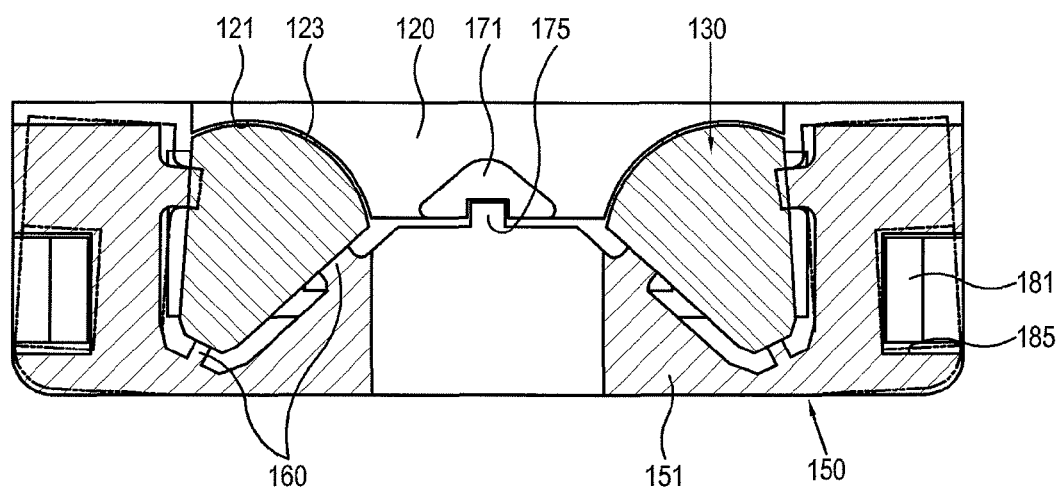
FIG. 5 is a sectional view of the illuminator in FIG. 2.

As illustrated therein, the illuminator 100 is employed in the scanner module and illuminates light to the object 15 on the document mount 10 along the second scanning direction Y of FIG. 3 substantially perpendicular to the first scanning direction X of the scanner module.

The illuminator 100 includes the light source 110 to emit light, the light source holder 120 to hold the light source 110, the light guiding unit 130 lengthened in the second scanning direction Y, that is, light guiding unit 130 formed in a lengthwise direction parallel to the second scanning direction Y, to face the document mount 10, and the guide holder 150 to hold the light guiding unit 130.

The light source 110 includes a substrate 111 installed at the light source holder 120, and a light emitting diode 115 provided in the substrate 111.

Referring to FIGS. 2 and 3, the light source holder 120 may include a first light source holder 120a and a second light source holder 120b provided at opposite sides of the guide holder 150, respectively. In this case, the light source 110 includes first and second substrates 111a and 111b provided in the first and second light source holders 120a and 120b, respectively. Here, at least one light emitting diode 115 is provided at the first and second substrates 111a and 111b, respectively.

In the present embodiment, the light sources 110 are placed at opposite sides of the light guiding unit 130 by the first and second light source holders 120a and 120b, but not limited thereto. Alternatively, the light source may be placed at one side of the first and second light source holders 120a and 120b.

The light guiding unit 130 changes a traveling path of the light emitted from the light source 111 so as to illuminate an image reading area of the document mount 10. The light guiding unit 130 may be provided in plural in consideration of the quantity of light illuminating the image reading area or etc.

In this embodiment, the light guiding unit 130 of the illuminator 100 may include first and second light guiding members 131 and 135. However, the present general inventive concept is not limited thereto. It is possible that the number of light guiding members of the light guiding unit 130 may be three or more.

The first light guiding member 131 is made of a transparent material, such as glass, plastic or the like, and lengthened in the second scanning direction Y to have a bar shape, for example. The first light guiding member 131 has an incident surface 131a, a guide surface 131b, and an exit surface 131c.

The incident surface 131a may be a surface to receive the light from the light source 110, and may be formed on at least one of two end portions of the first light guiding member 131.

The light source 110 is provided to face the incident surface 131a by the light source holder 120.

The exit surface 131c may face the document mount 10, and allow the light reflected and diffused by the guide surface 131b to exit toward the object 15. The exit surface 131c may be formed as a shape of a condensing lens.

The guiding surface 131b is provided at two lateral sides of the first light guiding member 131 and guides the light incident on the incident surface 131a to exit throughout the exit surface 131c on the basis of total internal reflection.

The second light guiding member 135 is arranged in the vicinity of the first light guiding member 131 and has substantially the same configuration and optical arrangement with the first light guiding member 131, and thus detailed descriptions thereof will be omitted. Here, the first and second light guiding members 131 and 135 are slantly arranged in the guide holder 150 without interfering with a traveling path of the light reflected from the object 15. That is, as illustrated in FIG. 1, center lines $C_1$ and $C_2$ of the light exiting from the first and second light guiding members 131 and 135 are inclined with respect to a center axis Z along which the light reflected from the object 15 travels toward the mirror unit and/or the sensor unit 300. The first light guiding member 131 and the second light guiding member 135 are spaced-apart from each other to form a gap therebetween to allow the light reflected from the object 15 to pass through the gap.

The guide holder 150 guides the light guiding unit 130 and the light source 110 to be aligned at an installation position. For this, the guide holder 150 includes the mounting part 153 where the light source holder 120 is mounted to place the light source 110 at least one side of the light guiding unit 130, and the installation part 155 where the light guiding unit 130 is installed.

In the case that the first and second light guiding members 131 and 135 are provided as the light guiding unit 130, the installation part 155 includes first and second installation portions 155a and 155b where the first and second light guiding members 131 and 135 are installed, respectively.

The installation part 155 is formed in the guide holder main body 151, extended in the second scanning direction Y, and shaped corresponding to the shape of the light guiding unit 130. For example, the installation part 155 is recessed to form an inward-tapered trapezoidal cross-section.

Accordingly, the light guiding unit 130 can be put down (disposed or installed) on the installation part 155 from over the installation part 155, thereby decreasing or preventing a scratch or the like that may be formed on an exterior surface of the light guiding unit 130 when the light guiding unit 130 is longitudinally inserted in the installation part 155. In other words, the installation part 155 has a height shorter length and is recessed to have a trapezoidal cross-section, so that contact between the light guiding unit 130 and the installation part 155 is reduced when the light guiding unit 130 is installed at the installation part 155 in a direction of the height of the installation, thereby decreasing damage in the light guiding unit 130.

Meanwhile, the guide holder 150 may be made of a flexible material. For instance, before installing the light guiding unit 130 at the installation part 155, the installation part 155 may be narrower than a space needed to be occupied by the light guiding unit 130 (refer to a dotted line in FIG. 5). The guide holder 150 has an original shape when the light guiding unit 130 is installed in the installation part 155, and another shape changed from the original shape when the light guiding unit 130 is installed in the installation part 155 such that the guide holder 150 can elastically hold the light guiding unit 130 and tightly hold and support the light guiding unit 130.

Thus, the installation part 155 becomes wider when accommodating the light guiding unit 130 therein and tightly holds the light guiding unit 130.

In addition, the illuminator 100 may include a spacer 160 provided inside the installation part 155 to contact and/or support the light guiding unit 130.

While the installation part 155 accommodates the light guiding unit 130 therein, the spacer 160 directly supports the light guiding unit 130, thereby spacing the light guiding unit 130 from the installation part 155. Thus, the spacer 160 stably supports the light guiding unit 130 even though the guide holder 150 is manufactured with the installation part 155 having a deformed space or the like. Accordingly, the light guiding unit 130 is prevented from bending and is maintained in a straight line position.

Here, the spacer 160 may include a plurality of spacers provided along a lengthwise direction of the light guiding unit 130, which are distant from each other. That is, the spacer 160 may include first through third spacers 160a, 160b and 160c. The first and third spacers 160a and 160c are placed at opposite end portions of the installation part 155, and the second spacers 160b are placed at a middle portion of the installation part 155. Thus, each of the first through third spacers 160a, 160b and 160c can support the light guiding unit 130 at three points, i.e., opposite lateral walls and one bottom of the installation part 155.

Further, a space between the opposite spacers formed at the lateral walls is narrower than the width corresponding to the light guiding unit 130. Thus, when the light guiding unit 130 is installed in the installation part 155, the guide holder 150 is elastically transformed to secure an occupying space for the light guiding unit 130 while bring the light guiding unit 130 into closely contact with the spacers.

Here, the spacer 160 and the guide holder 150 may be formed as a single body to thereby enhance assembling efficiency and reduce production costs.

The light source holder 120 may include a holding part 121 to hold the light guiding unit 130 installed in the installation part 155. The holding part 121 protrudes from the light source holder 120 and has an inner portion shaped corresponding to the exit surface 131c of the light guiding unit 130, so that it directly or indirectly contacts the exit surface 131c of the light guiding unit 130, thereby preventing the light guiding unit 130 from moving up and down.

The light source holder 120 may have at least one hole 120c to allow the light emitted from a light emitting diode 115 to be incident on the incident surface 131a of the light guiding unit 130. The holding part 121 may protrude from a plane having the hole 121 to contact the end portion of the light guiding unit 130 (131 and/or 135) such that the holding part 121 of the light source holder 120 and the installation part 155 of the guide holder 150 can hold and support the light guiding unit 130.

In addition, the light source holder 120 may include a holding rib 123 provided on the holding part 121. The holding rib 123 partially contacts the light guiding unit 130 when the light guiding unit 130 is installed in the installation part 155, thereby holding the light guiding unit 130.

The holding part 121 may have a surface 120b having a shape correspond to a shape of the exit surface 131c of the light guiding unit 130 and extended from a surface 120a of the light source holder 120 toward a lengthwise direction of the light guiding unit 130, and the holding rib 123 may protrude from the surface 120b of the holding part 121 toward a plane of the exit surface 131c of the light guiding unit 130.

Also, the illuminator 100 may include position determiners 171 and 175 to determine an installation position of the light source holder 120 with respect to the guide holder 150. The position determiners 171 and 175 are formed at corresponding positions in the guide holder 150 and the light source holder 120, respectively, and each of the position determiners 171 and 175 has a symmetrical shape. Thus, the light source holder 120 is coupled to the guide holder 150 along a guide of the position determiners 171 and 175, so that the light source holder 120 and the guide holder 150 are quickly and precisely assembled.

It is preferable but not necessary that the light source holder 120 is joined to the mounting part 153 of the guide holder 150 by a snap-fit structure. The snap-fit structure makes the assembly easy rather than screws or bonding.

As illustrated in FIG. 3, the light source holder 120 is jointed to the mounting part 153 in the lengthwise direction of the light guiding unit 130. To join the light source holder 120 with the mounting part 153, a hook member 181 and a projection 185 are provided.

Refer to FIGS. 6 and 7, the hook member 181 protrudes from a surface of the light source holder 120 facing the guide holder 150, and the projection 185 is formed in the guide holder 150 at a position to correspond to the hook member 181. Further, the hook member 181 and the projection 185 are formed with slant contact parts 181a and 185a, respectively. Accordingly, when the light source holder 120 is inserted in the guide holder 150 along the lengthwise direction of the light guiding unit 130, the hook member 181 is elastically transformed as the contact parts 181a and 185a meet each other. Then, the hook member 181 is readily hooked to the projection 185 with a snap, thereby joining the light source holder 120 with the guide holder 150.

In the meantime, while the light source holder 120 joins with the guide holder 150, the light guiding unit 130 may be scratched because a contact point between the holding rib 123 and the light guiding unit 130 moves.

To solve this problem, the holding rib 123 may have a tapered shape as illustrated in FIG. 6. The tapered shape of the holding rib 123 can reduce or prevent the scratch on the light guiding unit 130 when the light source holder 120 joins with the guide holder 150.

Further, as illustrated in FIG. 6, the holding rib 123 includes a neck part 123a to stably hold the light guiding unit 130 even though the light guiding unit 130 is thermally expanded in its height direction. The neck part 123a is provided between the holding part 121 and the holding rib 123.

The neck part 123a may have a groove or a gap to separate a distal end of the holding rib 123 of the guide holder 120 such that the distal end of the holding rib 123 can elastically move with respect to the holding part 121.

If pressure applied to an outer surface of the holding rib 123 increases as the light guiding unit 130 is thermally deformed, the neck part 123a is elastically transformed as shown in the dotted line of FIG. 6. Accordingly, the light guiding unit 130 is stably held and supported without damaging the holding rib 123. Meanwhile, the structure of the holding rib 123 against the thermal deformation of the light guiding unit 130 is not limited to the neck part 123a and may vary. Also, the light source holder 120 may be made of an elastic or flexible material to stably support the light guiding unit 130.

In the foregoing embodiment, the hook member 181 is provided in the light source holder 120 and the projection 185 is provided in the guide holder 150, but not limited thereto. Alternatively, the hook member may be provided in the guide holder 120 and the projection may be provided in the light source holder 150.

Figure 8:
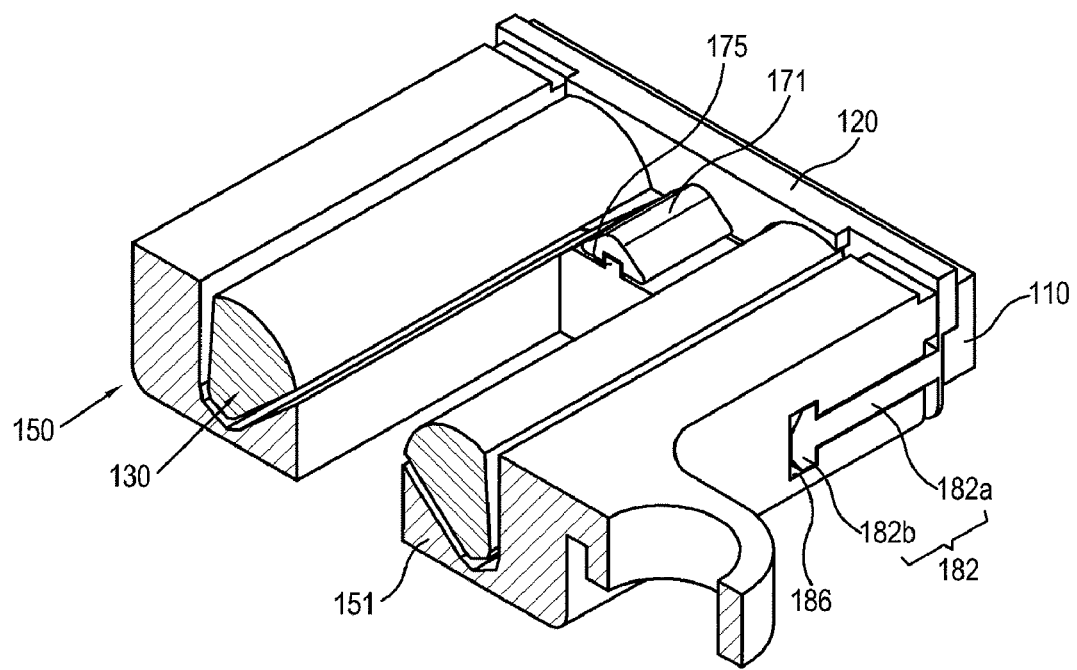
FIG. 8 is a partially sectioned perspective view illustrating an example of an illuminator in the scanner module according to an exemplary embodiment of the present general inventive concept.

Further, the hook member is not limited to the foregoing structure and may have a structure illustrated in FIG. 8, for example. In this case, a hook member 182 includes an extended portion 182a extended from the light source holder 120, and a head portion 182b formed at an end part of the extended portion 182a. Here, the head portion 182b is wider than the extended portion 182a.

Also, the guide holder main body 151 is formed with an accommodating part 186 shaped corresponding to the hook member 182. Thus, the hook member 182 is coupled to the accommodating part 186 by a snap-fit manner, thereby joining the light source holder 120 with the guide holder 150.

Figure 9:
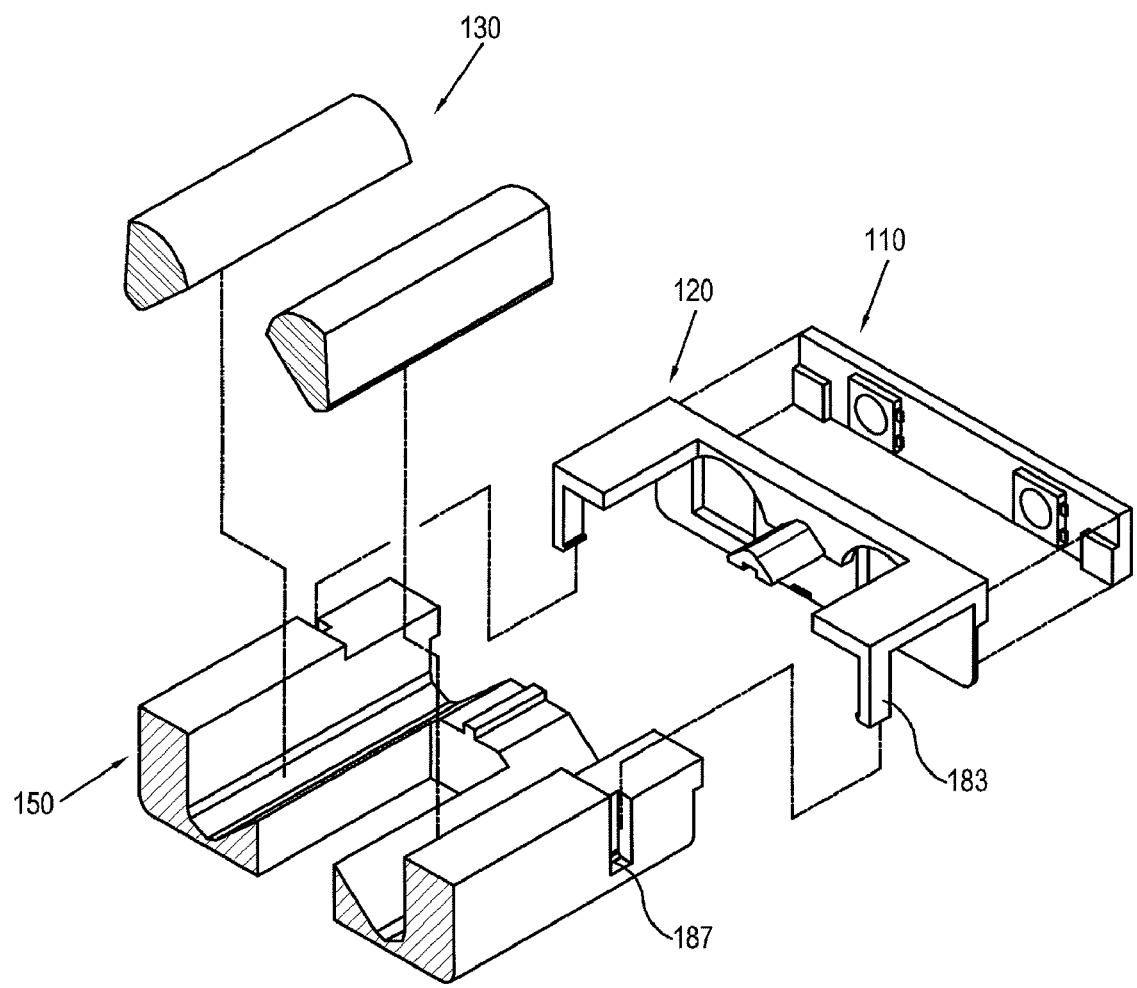
FIG. 9 is a partially sectioned perspective view illustrating an example of an illuminator in the scanner module according to an exemplary embodiment of the present general inventive concept.

Alternatively, the light source holder 120 may join with the mounting part 153 in a direction perpendicular to the lengthwise direction of the light guiding unit 130 (refer to FIG. 9). In this case, the illuminator 100 includes a hook member 183 and a projection 187 in order to join the light source holder 120 to the mounting part 153.

As illustrated in FIG. 9, the hook member 183 protrudes down from a lateral side of the light source holder 120, and the projection 187 is formed in the guide holder 150 at a position to correspond to the hook member 183. Further, the hook member 183 and the projection 187 are formed with slant contact parts, respectively, and cause the hook member 183 to be smoothly hooked to the projection 187 with a snap, thereby joining the light source holder 120 with the guide holder 150.

In this embodiment, while the light source holder 120 joins with the guide holder 150, the light guiding unit 130 is radically prevented from a scratch because a contact point between the holding rib 123 and the light guiding unit 130 is not changed.

In this illuminator with the foregoing configuration, the light guiding unit and the light source are precisely aligned and quickly assembled. Further, the light guiding unit is stably supported and straightly maintained.

Figure 10:
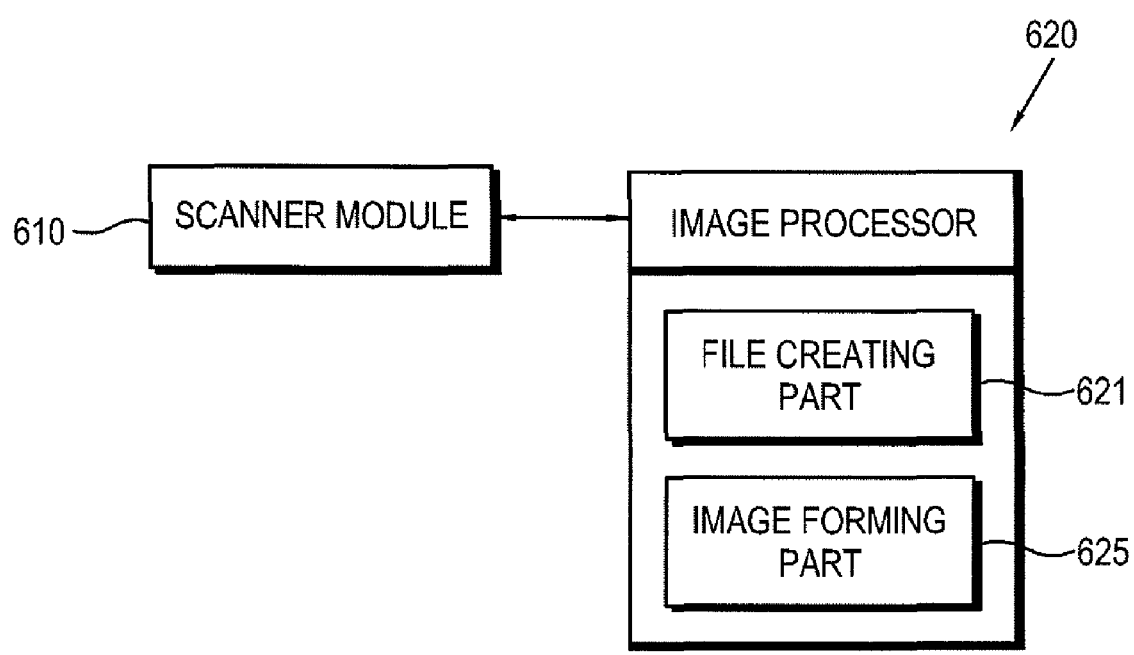
FIG. 10 is a block diagram of an image scanning apparatus according to an exemplary embodiment of the present general inventive concept.

FIG. 10 is a block diagram illustrating an image scanning apparatus according to an exemplary embodiment of the present general inventive concept.

As illustrated therein, the image scanning apparatus according to an exemplary embodiment of the present general inventive concept includes a scanner module 610, and an image processor 620 to process an image obtained from the scanner module 610. Here, the image scanning apparatus includes a multi-function printer (MFP), a digital copier or a scanner.

The scanner module 610 may be substantially similar to the scanner module of FIG. 1, and thus detailed descriptions thereof will be omitted.

The image processor 620 includes at least one of a file creating part 621 to create an image file from an image obtained by the sensor unit 300 (refer to FIG. 13) of the scanner module 610, and an image forming part 625 to form an image corresponding to the obtained image on a printing medium.

As described above, in the multi-functional device having the scanner module and the image scanning apparatus according to an exemplary embodiment of the present general inventive concept, the guide holder has the installation part and the light guiding unit is installed in the installation part in a height direction of the installation part, thereby reducing a scratch or the like on the light guiding unit. Further, the position determiner allows the light guiding unit and the light source to be precisely aligned, thereby achieving precise assembly. Also, the light source holder joins with the guide holder by the snap-fit manner, thereby enhancing productivity.

Further, the guide holder is made of a flexible material, so that the long and thin light guiding unit can be stably supported even though the guide holder is deformed, thereby maintaining the light guiding unit straightly.

Accordingly, the image scanning apparatus employing the illuminator is decreased in production costs, increased in productivity, and improved in precise illumination to thereby reduce a scanning error.

Although a few exemplary embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A multi-functional device comprising:
a document mount; and
a scanner module installed below the document mount so as to be movable as a single moveable body in a first scanning direction with respect to an object on the document mount, the scanner module including:
a light source to emit light,
a light source holder to hold the light source,
a light guiding unit, which extends lengthwise in a second scanning direction perpendicular to the first scanning direction, to face the document mount and to change a traveling path of the light emitted from the light source to illuminate the document mount,
a guide holder comprising an installation part to which the light guiding unit is installed and a mounting part to which the light source holder is mounted, the guide holder disposed to expose at least one side of the light guiding unit to the light emitted from the light source,
a sensor unit to read an image information of the object on the document mount by light reflected from the object,
a first reflecting mirror to guide the light reflected from the object,
at least one second reflecting mirror to guide the light reflected from the first reflecting mirror to the sensor unit,
an imaging lens, which is disposed between the reflecting mirrors and the sensor unit, to focus the light reflected by the reflecting mirrors onto the sensor unit,
an incident surface disposed at a longitudinal end of the light guiding unit to receive the light from the light source, the light source being disposed at the incident surface,
a guide surface to reflect and diffuse the light received on the incident surface, the guide surface being surrounded by the guide holder, and
an exit surface facing the document mount to allow the light reflected and diffused by the guide surface to exit toward the object on the document mount,
wherein the guide holder includes at least one spacer protruded from a surface of the installation part to support the light guiding unit.

2. The multi-functional device according to claim 1, wherein:
the guide holder comprises an opening through which the light reflected from the object passes; and
the light emitted through the opening is incident upon the first reflecting mirror.

3. The multi-functional device according to claim 2, wherein:
the light guiding unit includes first and second light guiding members spaced-apart from each other in the first scanning direction;
the guide holder integrated into one structure supports the first and second light guiding members; and
the opening is formed between the first and second light guiding members.

4. The multi-functional device according to claim 1, wherein:
the reflecting mirrors, the imaging lens, and the sensor unit are disposed below the guide holder; and
the light reflected from the object is guided to a region below the guide holder, is reflected by the reflecting mirrors, and then reaches the sensor unit.

5. The multi-functional device according to claim 1, wherein:
the guide holder includes a mounting part where the light source holder is mounted; and
the light source holder joins with the mounting part in a snap-fit manner.

6. The multi-functional device according to claim 5, wherein the light source holder joins with the mounting part in a lengthwise direction of the light guiding unit.

7. The multi-functional device according to claim 5, wherein the light source holder joins with the mounting part in a direction perpendicular to a lengthwise direction of the light guiding unit.

8. The multi-functional device according to claim 1, wherein the light source includes:
a substrate installed at the light source holder; and
a light emitting diode provided on the substrate.

9. The multi-functional device according to claim 1, further comprising a holding rib provided on a holding part of the light source holder to partially support the exit plane of the of the light guiding unit installed in the installation part and thus to hold the light guiding unit.

10. The multi-functional device according to claim 9, wherein the holding rib includes a neck part allowing the holding rib to be elastically deformed.

11. The multi-functional device according to claim 10, wherein the guide holder is made of a flexible material so that the installation part can become wider when pushed by the light guiding unit while installing the light guiding unit therein.

12. The multi-functional device according to claim 1, wherein:
the installation part is recessed inwardly and lengthened in the second scanning direction; and
the light guiding unit is fitted into the installation part from over the installation part.

13. The multi-functional device according to claim 1, wherein the at least one spacer includes a plurality of spacers spaced-apart from each other in a lengthwise direction of the light guiding unit.

14. The multi-functional device according to claim 1, further comprising position determiners provided at corresponding positions in the guide holder and the light source holder to determine an installation position of the light source holder with respect to the guide holder.

15. The multi-functional device according to claim 1, wherein the light source includes:
a substrate installed at the light source holder; and
a white light emitting diode provided on the substrate.

16. The multi-functional device according to claim 1, wherein the first reflecting mirror is positioned below the second light path extending between the last one of the at least one second reflecting mirror and the sensor unit.

17. The multi-functional device of claim 1, wherein the light source holder joins with the mounting part in a lengthwise direction of the light guiding unit.

18. The multi-functional device of claim 1, wherein the light source holder joins with the mounting part in a direction perpendicular to a lengthwise direction of the light guiding unit.

19. A multi-functional device comprising:
   a document mount; and
   a scanner module installed below the document mount so as to be movable as a single moveable body in a first scanning direction with respect to an object on the document mount, the scanner module including:
      a light source to emit light,
      a light source holder to hold the light source,
      a light guiding unit, which extends lengthwise in a second scanning direction perpendicular to the first scanning direction, to face the document mount and to change a traveling path of the light emitted from the light source to illuminate the document mount,
      a guide holder comprising an installation part to which the light guiding unit is installed and a mounting part to which the light source holder is mounted, the guide holder disposed to expose at least one side of the light guiding unit to the light emitted from the light source,
      a sensor unit to read an image information of the object on the document mount by light reflected from the object,
      a first reflecting mirror to guide the light reflected from the object,
      at least one second reflecting mirror to guide the light reflected from the first reflecting mirror to the sensor unit,
      an imaging lens, which is disposed between the reflecting mirrors and the sensor unit, to focus the light reflected by the reflecting mirrors onto the sensor unit,
      an incident surface disposed at a longitudinal end of the light guiding unit to receive the light from the light source, the light source being disposed at the incident surface,
      a guide surface to reflect and diffuse the light received on the incident surface, the guide surface being surrounded by the guide holder, and
      an exit surface facing the document mount to allow the light reflected and diffused by the guide surface to exit toward the object on the document mount,
   wherein the one of the light source holder and the guide holder comprises a hook member, and the other of the light source holder and the guide holder comprises a projection, such that the hook member is coupled with the projection.

20. A scanner module movable in a first scanning direction comprising:
   a light guiding unit, which extends lengthwise in a second scanning direction perpendicular to the first scanning direction, to face the document mount and to change a traveling path of the light emitted from the light source onto the object,
   a guide holder comprising an installation part to which the light guiding unit is installed and a mounting part to which the light source holder is mounted, the guide holder disposed to expose at least one side of the light guiding unit to the light emitted from the light source;
   a sensor unit to read an image information of the object on the document mount by light reflected from the object,
   a first reflecting mirror to guide the light reflected from the object,
   at least one second reflecting mirror to guide the light reflected from the first reflecting mirror to the sensor unit,
   an imaging lens, which is disposed between the reflecting mirrors and the sensor unit, to focus the light reflected by the reflecting mirrors onto the sensor unit;
   an incident surface disposed at a longitudinal end of the light guiding unit to receive the light from the light source, the light source being disposed at the incident surface and
   an exit surface facing the object to allow the light reflected and diffused by the guide surface to exit toward the object,
   wherein the guide holder includes at least one spacer protruded from a surface of the installation part to support the light guiding unit.

21. The scanner module according to claim 20, wherein:
   the guide holder comprises an opening through which the light reflected from the object to passes; and
   the light emitted through the opening is incident upon the first reflecting mirror.

22. The scanner module according to claim 21, wherein:
   the light guiding unit includes first and second light guiding members spaced-apart from each other in the first scanning direction;
   the guide holder integrated into one structure supports the first and second light guiding members; and
   the opening is formed between the first and second light guiding members.

23. The scanner module according to claim 20, wherein:
   the reflecting mirrors, the imaging lens, and the sensor unit are disposed below the guide holder; and
   the light reflected from the object is guided to a region below the guide holder, is reflected by the reflecting mirrors, and then reaches the sensor unit.

24. The scanner module according to claim 20, wherein:
   the guide holder includes a mounting part where the light source holder is mounted; and
   the light source holder joins with the mounting part in a snap-fit manner.

25. The scanner module according to claim 24, wherein the light source holder joins with the mounting part in a lengthwise direction of the light guiding unit.

26. The scanner module according to claim 24, wherein the light source holder joins with the mounting part in a direction perpendicular to a lengthwise direction of the light guiding unit.

27. The scanner module according to claim 20, wherein the light source includes:
   a substrate installed at the light source holder; and
   a light emitting diode provided on the substrate.

28. The scanner module according to claim 20, further comprising:
   a holding rib provided on a holding part of the light source holder to partially support the exit plane of the of the light guiding unit installed in the installation part and thus to hold the light guiding unit.

29. The scanner module according to claim 28, wherein the holding rib includes a neck part allowing the holding rib to be elastically deformed.

30. The scanner module according to claim 29, wherein the guide holder is made of a flexible material so that the installation part can become wider when pushed by the light guiding unit while installing the light guiding unit therein.

31. The scanner module according to claim 20, wherein:
   the installation part is recessed inwardly and lengthened in the second scanning direction; and
   the light guiding unit is fitted into the installation part from over the installation part.

32. The scanner module according to claim 20, wherein the at least one spacer includes a plurality of spacers spaced-apart from each other in a lengthwise direction of the light guiding unit.

33. The scanner module according to claim 20, further comprising:
position determiners provided at corresponding positions in the guide holder and the light source holder to determine an installation position of the light source holder with respect to the guide holder.

34. The scanner module according to claim 20, wherein the light source includes:
a substrate installed at the light source holder; and
a white light emitting diode provided on the substrate.

35. The scanner module according to claim 20, wherein the first reflecting mirror is positioned below the second light path extending between the last one of the at least one second reflecting mirror and the sensor unit.

36. The multi-functional device of claim 20, wherein the light source holder joins with the mounting part in a lengthwise direction of the light guiding unit.

37. The multi-functional device of claim 20, wherein the light source holder joins with the mounting part in a direction perpendicular to a lengthwise direction of the light guiding unit.

38. A scanner module movable in a first scanning direction comprising:
a light source to emit light,
a light source holder to hold the light source,
a light guiding unit, which extends lengthwise in a second scanning direction perpendicular to the first scanning direction, to face the document mount and to change a traveling path of the light emitted from the light source to illuminate the document mount,
a guide holder comprising an installation part to which the light guiding unit is installed and a mounting part to which the light source holder is mounted, the guide holder disposed to expose at least one side of the light guiding unit to the light emitted from the light source,
a sensor unit to read an image information of the object on the document mount by light reflected from the object,
a first reflecting mirror to guide the light reflected from the object,
at least one second reflecting mirror to guide the light reflected from the first reflecting mirror to the sensor unit,
an imaging lens, which is disposed between the reflecting mirrors and the sensor unit, to focus the light reflected by the reflecting mirrors onto the sensor unit,
an incident surface disposed at a longitudinal end of the light guiding unit to receive the light from the light source, the light source being disposed at the incident surface,
a guide surface to reflect and diffuse the light received on the incident surface, the guide surface being surrounded by the guide holder, and
an exit surface facing the document mount to allow the light reflected and diffused by the guide surface to exit toward the object on the document mount,
wherein one of the light source holder and the guide holder comprises a hook member, and the other of the light source holder and the guide holder comprises a projection, such that the hook member is coupled with the projection.

\* \* \* \* \*